No. 798,453. PATENTED AUG. 29, 1905.
P. M. SCANLAN.
BUTTER CUTTER.
APPLICATION FILED DEC. 31, 1904.
2 SHEETS—SHEET 2.
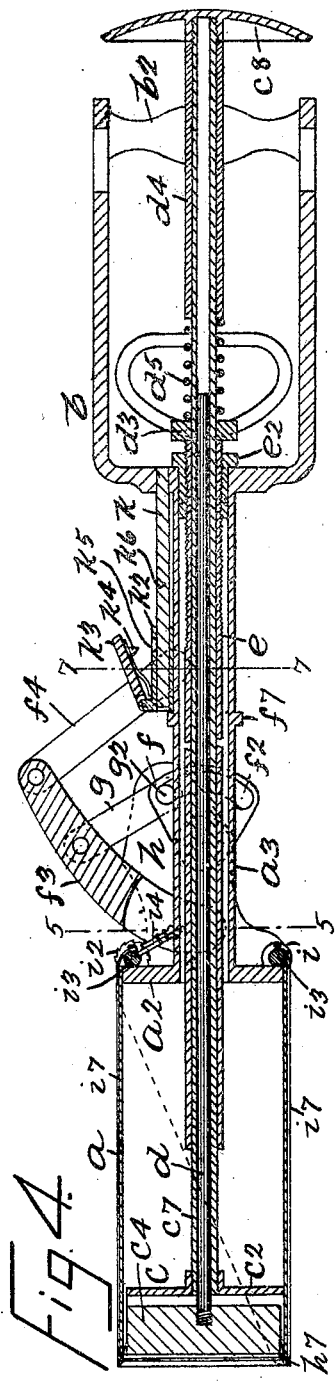
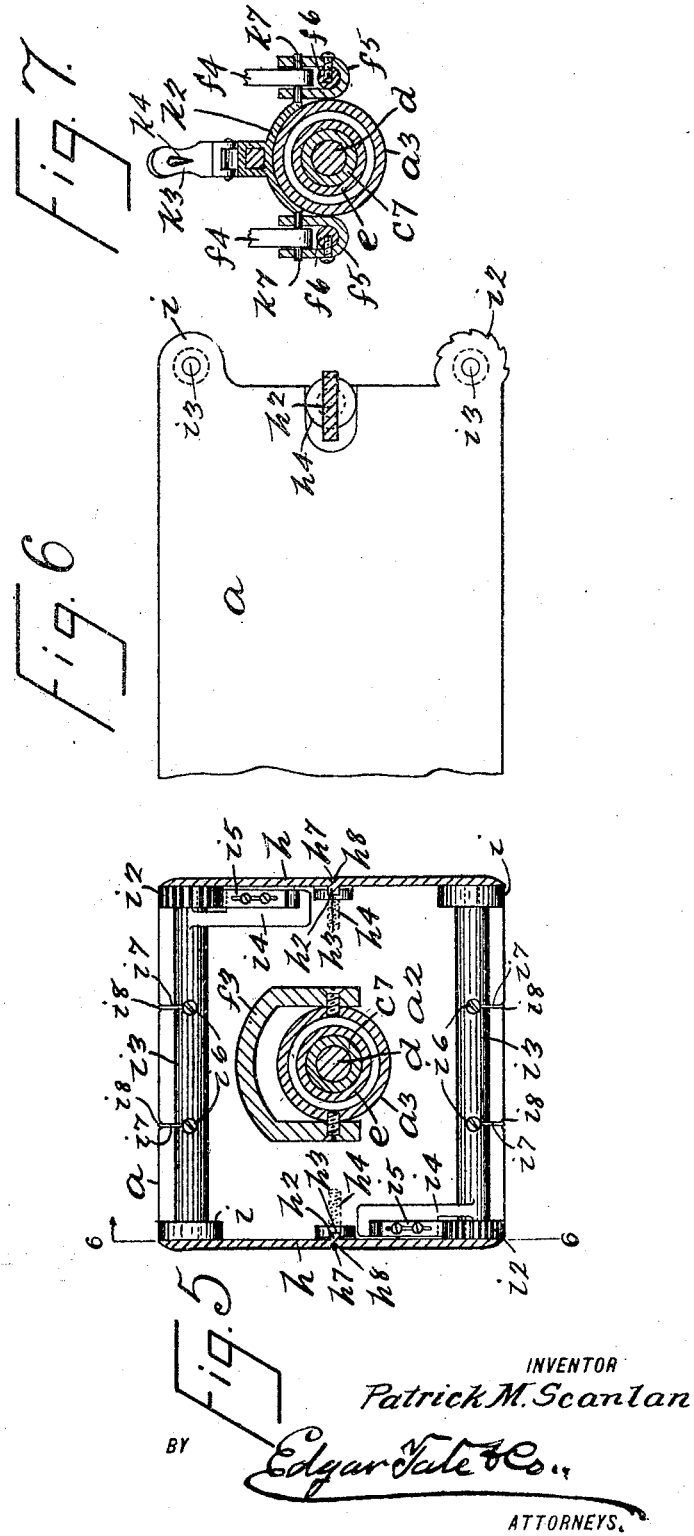
WITNESSES
F. A. Stewart
J. E. Larsen
INVENTOR
Patrick M. Scanlan
BY
Edgar Tate & Co.
ATTORNEYS.

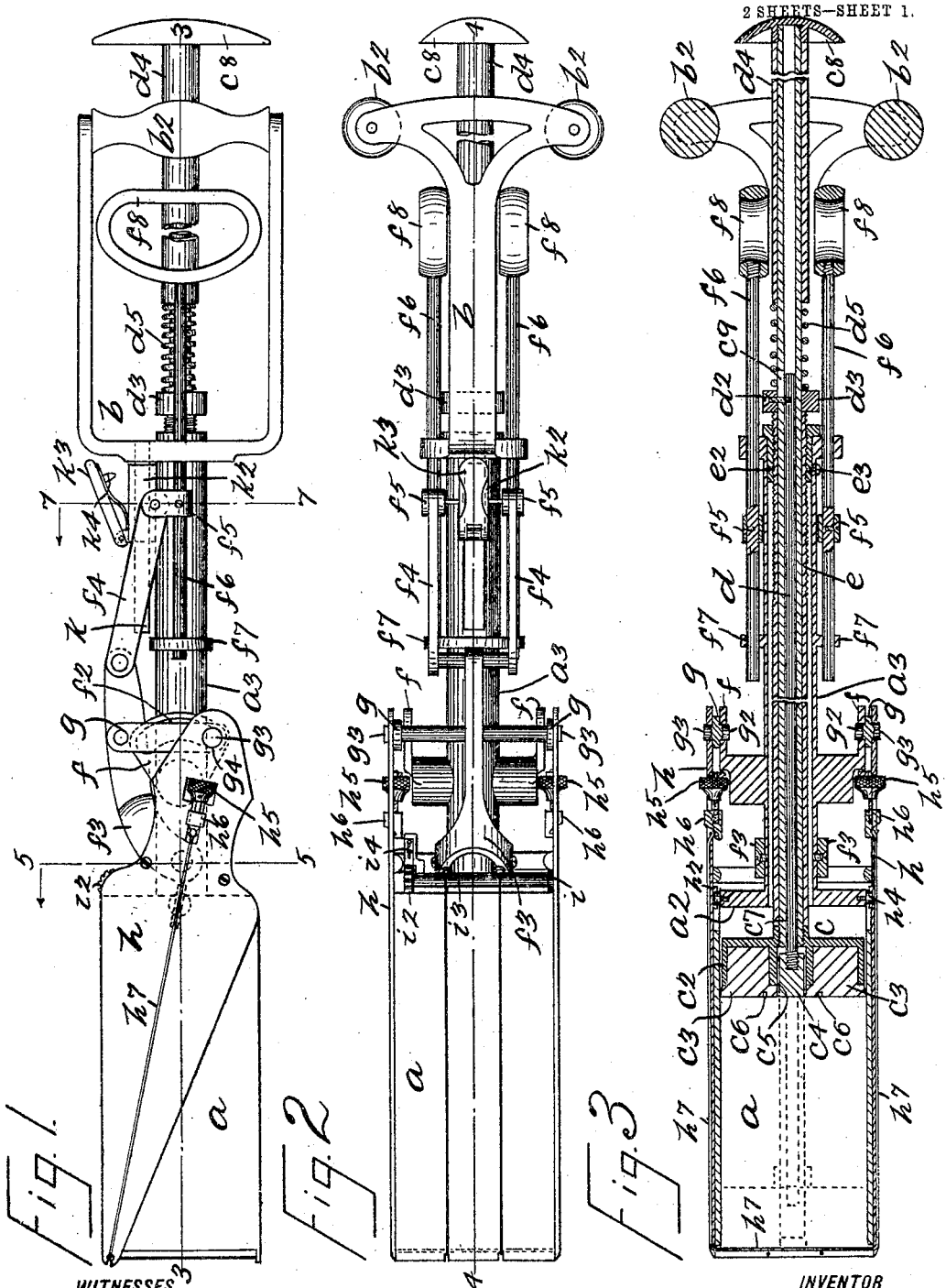

UNITED STATES PATENT OFFICE.

PATRICK M. SCANLAN, OF BROOKLYN, NEW YORK.

BUTTER-CUTTER.

No. 798,453.  Specification of Letters Patent.  Patented Aug. 29, 1905.

Application filed December 31, 1904. Serial No. 239,074.

*To all whom it may concern:*

Be it known that I, PATRICK M. SCANLAN, a citizen of the United States, residing at Brooklyn, in the county of Kings and State of New York, have invented certain new and useful Improvements in Butter-Cutters, of which the following is a specification, such as will enable those skilled in the art to which it appertains to make and use the same.

The object of this invention is to provide an improved device for cutting butter in tubs and other vessels, so as to remove the same therefrom and at the same time to divide the said butter into predetermined weights for retailing or other purposes, and this is an improvement over that shown and described by me in an application filed October 8, 1904, Serial No. 227,638, said improvement being in the simplification of the device and also to provide a perfectly smooth surface on all sides of that portion of my cutting device which is passed into the butter or other material to be cut.

The invention is fully disclosed in the following specification, of which the accompanying drawings form a part, in which the separate parts of my improvement are designated by suitable reference characters in each of the views, and in which—

Figure 1 is a side elevation of a butter-cutter constructed according to my invention; Fig. 2, a plan view thereof; Fig. 3, a longitudinal section on the line 3 3 of Fig. 1; Fig. 4, a longitudinal section on the line 4 4 of Fig. 2; Fig. 5, a transverse section, somewhat enlarged, taken on the line 5 5 of Figs. 1 and 4; Fig. 6, a section on the line 6 6 of Fig. 5, and Fig. 7 a section on the line 7 7 of Figs. 1 and 4.

In the drawings forming part of this specification I have shown a casing $a$, which is rectangular in cross-section and is provided with a head $a^2$ at one end thereof, said head $a^2$ having a tube $a^3$ secured thereon and said tube $a^3$ being provided at the end opposite the casing $a$ with a yoke-shaped frame $b$, carrying handles $b^2$, whereby the device may be manipulated, and within the casing $a$ is a plunger $c$, consisting of a metal frame $c^2$, carrying blocks $c^3$, preferably of wood, and a central transverse block $c^4$, operating in the space $c^5$ between the two blocks $c^3$, and the blocks $c^3$ are scored, as shown at $c^6$. The frame $c^2$ is detachably connected with a tube $c^7$, which passes through the tube $a^3$, and the tube $c^7$ is provided with a plate $c^8$ at its inner end and with a slot $c^9$ at a point adjacent to the end of the tube $a^3$, and within the tube $c^7$ and slidable therein is a rod $d$, which is detachably secured to the transverse block $c^4$ in the plunger $c$, and in the other end of said rod $d$ is secured a screw $d^2$, which passes through the slot $c^9$ of the tube $c^7$ and is secured in the collar $d^3$, adapted to slide on the tube $c^7$, and the tube $c^7$ at its inner end is provided with a sleeve $d^4$, between which and said collar $d^3$ is a coil-spring $d^5$.

Slidably mounted on the tube $c^7$ and within the tube $a^3$ is a tube $e$, which is screw-threaded at its inner end, said screw-threaded end being engaged by a sleeve $e^2$, operating in the tube $a^3$, and the rod of which moves the tube $e$ laterally, as will be understood, the sleeve $e^2$ being held against lateral movement by means of a screw $e^3$, secured in the tube $a^3$, and the outer end of the tube $e$ bears against the frame $c^2$ of the plunger $c$, and, as will be seen, when the sleeve $e^2$ is rotated and the tube $e$ moved correspondingly the limit of movement of the plunger $c$ is thereby varied according to such movement.

Mounted on either side of the tube $a^3$ adjacent to the casing $a$ is a plate $f$, within which is formed a segmental slot $f^2$, and between the plates $f$ and the head $a^2$ of the casing $a$ is pivoted a yoke-shaped arm $f^3$, the other end of which is pivotally connected with two links $f^4$, which are in turn pivoted to brackets $f^5$, secured on rods $f^6$, slidably mounted in guides $f^7$ on the tube $a^3$, said rods $f^6$ being provided with handles $f^8$ within the yoke-shaped frame $b$, and also pivotally connected with the arm $f^3$ are two links $g$, provided with circular stub-shafts $g^2$, operating in the corresponding segmental slots $f^2$, and directly opposite the stub-shafts $g^2$ on each of the links $g$ is a similar stub-shaft $g^3$, which passes through an opening $g^4$ in a blade $h$, one of which is mounted on each side of the casing $a$, said blades being provided at their pivotal points with a laterally-projecting member $h^2$, adapted to slide in the heads $h^3$ of screws $h^4$, secured in the head $a^2$ of the casing $a$, and by means of this construction it will be seen that the blades $h$ are capable of rotary movement as well as lateral movement.

Secured in each of the blades $h$ is a turn-screw $h^5$, operating in a slide $h^6$, which is hook-shaped at its outer end, said slide $h^6$ operating in suitable slots in the blades $h$, and connected with each of the slides $h^6$ is a wire $h^7$, which passes to the outer end of the blades $h$ and across the open end of the casing $a$, and when the turn-screws $h^5$ are rotated the wire $h^7$ is tightened or loosened thereby, and in practice I prefer to sink the wires $h^7$ into the blades $h$, as shown at $h^8$ in Fig. 5, thereby insuring a perfectly flush or smooth surface to the blades $h$.

Rotatably mounted in supports $i$ and $i^2$ on the head $a^2$ are shafts $i^3$, to each of which is secured a plate $i^4$, upon which is slidably mounted a plate $i^5$, and the supports $i^2$ of the shafts $i^3$ are provided with ratchet-teeth, as clearly shown in the drawings, and the slide-plates $i^5$ are adapted to engage the ratchet-teeth of the supports $i^2$, thereby holding the shafts $i^3$ against rotation, and mounted on each of the shafts $i^3$ are screws $i^6$, which are arranged in pairs, each one of each of said pairs being directly opposite the other one of each of said pairs, and to each of the screws of each of said pairs is secured a wire $i^7$, preferably sunk into the casing $a$, as shown at $i^8$ in Fig. 5, and the wire $i^7$ passes over the open end of the casing $a$ at right angles to the wire $h^7$, and if the plates $i^5$ be disconnected from the ratchet-teeth of the supports $i^2$ the shafts $i^3$ may be rotated, thereby tightening or loosening the wire $i^7$, as will be understood.

Secured to the yoke-shaped frame $b$ is a laterally-extending arm $k$, upon which is slidably mounted a casing $k^2$, provided with a hinged spring-operated member $k^3$ on the top thereof, said member $k^3$ being provided with an upwardly-directed pin $k^4$, adapted to pass through an opening $k^5$ in the upper portion of the casing $k^2$ and into an opening $k^6$ in the arm $k$ when the casing $k^2$ is in position to permit the same, and, as shown in Fig. 7, the casing $k^2$ is connected with the pivot-pin $k^7$ in the brackets $f^5$, and because of this construction when the handles $f^8$ and rods $f^6$ are moved laterally the casing $k^2$ is moved correspondingly, as are also the blades $h$, one position of these parts being shown in Fig. 1 and the other position in Fig. 2, and in each of these positions the wire $h^7$ is at the edge of the open end of the casing $a$, and in the intermediate position of this wire the parts last named are in their intermediate positions, at which time the hinged member $k^3$ may be normally forced downwardly until the pin $k^4$ enters the recess $k^6$ of the arm $k$, thereby locking the casing $k^2$, wire $h^7$, and connected parts against movement.

In the operation of my cutting device the plunger $c$ is in its extreme inner position, as will be understood, and the casing $a$ is driven into a tub of butter, lard, or similar material which it is desired to remove from the tub or other receptacle, and the blades $h$ are in the position shown in Fig. 1, and when the casing $a$ has been driven into the material to be cut as far as possible the handles $f^8$ are forced into their other position and in this movement operate the blades $h$ from one position to the other thereof, and thereby move the wire $h^7$ over the open end of the casing $a$, this movement of the wire $h^7$ separating that portion of the material within the casing $a$ from the bulk of the material of the receptacle from which it is desired to remove the same, and the casing $a$ is at this time removed from said receptacle.

It will be understood that the casing $a$ is made of a size to conform to that of a given weight of the material to be removed from a receptacle, and after the operation last described, if it is desired to remove the block of material from the casing $a$, all that is necessary is to force the plunger $c$ downwardly by means of pressure on the plate $c^8$ and the block of material is removed in its entirety, and if it is desired to divide the said block of material into two equal parts the handles $f^8$ are operated to their intermediate positions and the hinged member $k^3$ forced downwardly until the pin $k^4$ enters the recess $k^6$, this operation bringing the wire $h^7$ directly across the open end of the casing $a$ and centrally thereof, and if the plunger $c$ be at this time driven outwardly the block of material is divided into two equal parts by means of the wire $h^7$; but if the wires $i^7$ be employed the block of material is divided into three portions at right angles to the division thereof caused by the wire $h^7$, and thereby six portions of the block of material are formed, and if the plunger $c$ be forced outwardly a short distance and the handle $f^8$ operated correspondingly thick slices of each of these portions of the block of material results, and this may be done as often as desired, thereby producing portions of butter adapted for hotel or restaurant use each of a similar size, and if it is desired to separate the block of material into less than six portions either or both of the wires $i^7$ may be removed or the wire $h^7$ may be left in either of its extreme positions.

When the capacity of the casing $a$ is one pound and it is desired to remove a given portion thereof from the material in the tub or other receptacle, the sleeve $e^2$ is rotated until the tube $e$ is driven outwardly to the desired point, this movement of the tube $e$ being preferably indicated by means of a needle thereon and scale on the tube $a^3$, said registering device, however, not being shown in the drawings, and this position of the tube $e$ prevents the extreme backward movement of the plunger $c$, and a correspondingly smaller piece of material is thereby removed from the tub or other receptacle, and, as previously described, this block may be removed in its entirety or may be separated into suitable portions.

The scorings $c^6$ in the plunger $c$ are directly in line with the wires $i^7$, thereby permitting the outer face of the plunger $c$ to pass entirely out of the casing $a$; but in this operation the transverse block $c^4$, if permitted to move as far as the plunger $c$, would break the wire $h^7$, and when the entire plunger $c$ has been moved to a position adjacent to the wires $h^7$ and $i^7$ the block $c^4$ and rod $c^7$, connected therewith, stops because of the collar $d^3$ bearing against the tube $e$ or the sleeve $e^2$ and continued pressure on the plate $c^8$ forces the plunger $c$ outwardly beyond the block $c^4$ against the action of the spring $d^5$, said movement being limited by the length of the slot $c^9$, as will be understood, and in this way the butter or other material may be entirely expelled from the casing $a$ without injury to either of the wires $h^7$ or $i^7$.

It will be seen from this construction that increased leverage results and a slight movement of the handles $f^8$ will cause the blades $h$ to move their full limit and fewer parts are necessary than previously employed, and various changes in the construction herein shown and described within the scope of this invention may be made, and, with this reservation—

What I claim as new, and desire to secure by Letters Patent, is—

1. A butter-cutter, comprising a casing open at one end, a tube secured to the closed end of said casing, a handle secured to said tube, a plunger in said casing, a tube secured in said plunger and provided with a handle, a blade pivotally mounted on each side of said casing, a wire adjustably mounted in said blades, devices for moving said blades on their pivotal points, devices for locking said blades in their intermediate positions, a plurality of wires adjustably and detachably secured to said casing and passing over the open end thereof, a block in said plunger and devices for limiting the movement of said block in the movement of said plunger, substantially as shown and described.

2. A butter-cutter, comprising a casing open at one end, a handle connected therewith, a blade on either side thereof, a laterally-arranged block on the inner side of each of said blades, a screw in each side of said casing and provided with a slotted head in which the corresponding one of said laterally-arranged members is adapted to slide, and devices connected with said handle for moving said blades, substantially as shown and described.

3. In a butter-cutter, a casing open at one end, a handle connected therewith, a plunger in said casing, a handle connected therewith, a block in said plunger, and devices for limiting the outward movement of said block in the outward movement of said plunger, substantially as shown and described.

4. In a butter-cutter of the class described, a casing open at one end, a handle connected therewith, a plunger movable therein, a handle connected with said plunger, a block in said plunger, a rod connected with said block and secured in said rod and passing through a slot in said plunger-handle, said screw being also secured in a collar slidable on said plunger-handle, a tube mounted on said plunger-handle and provided with a screw-thread at one end thereof, a screw-threaded sleeve engaging said tube, and blades pivotally mounted on each side of said casing, a wire detachably and adjustably secured on said blades and passing over the open end of said casing, and devices for moving said blades and said wire, substantially as shown and described.

5. In a butter-cutter, a casing open at one end, a hollow shank connected therewith, a handle secured to said shank, a plunger in said casing, a blade rotatably and laterally movable on each side of said casing, a plate on each side of said shank and provided with a segmental slot, a yoke-lever pivoted on said shank, a link pivotally connected to said yoke-shaped lever and provided with a stub-shaft operating in said segmental slot, and a stub-shaft passing through the corresponding one of said blades, a rod slidably mounted on each side of said shank and provided with a handle member, a bracket mounted on each of said slidable rods, a connecting-rod pivotally connected with each of said brackets and with said yoke-lever, devices for locking said blades in a predetermined position, and devices for moving said plunger longitudinally of said casing, substantially as shown and described.

6. In a butter-cutter of the class described, a casing open at one end, a blade pivoted to each side thereof, a wire secured in said blades and passing over the open end of said casing, a plunger in said casing, devices for moving said blades, devices for moving said plunger, a plurality of wires on said casing and passing over the open end thereof, a shaft on said casing to which said wires are connected, a lever on said shaft, a segment-gear on said casing and serving as one of the supports for said shaft, and a plate slidably mounted on said lever and adapted to engage said segment-gear, substantially as shown and described.

7. In a butter-cutter, comprising a casing open at one end, a plunger movable therein, a blade pivotally mounted on each side of said casing, devices for moving said blades, a wire connected with said blades and passing over the open end of said casing, devices for moving said plunger; a turn-screw rotatably mounted in each of said blades, a slide operating in a slot in each of said blades and in operative connection with a corresponding turn-screw, each of said slides being provided with a hook member adapted to engage the corresponding end of said wire, substantially as shown and described.

8. In a butter-cutter, a casing open at one end, a shank connected therewith, a tube in said shank, a sleeve in operative connection therewith for moving said tube laterally, a supplemental tube in said first-named tube, a plunger secured to said last-named tube, a block in said plunger, a rod secured to said block, a collar on said supplemental tube, and a screw secured in said collar and said rod and passing through a slot in said supplemental tube, said supplemental tube being provided with a handle and a casing adjacent to said handle, and a spring mounted between said collar and said casing, substantially as shown and described.

9. A butter-cutter, comprising a casing open at one end, a plunger movable therein, a blade pivoted on each side thereof, a wire secured to said blades and passing over the open end of said casing, devices for moving said plunger, devices for moving said blades, an arm, a casing slidable thereon, a spring-operated hinged plate provided with a downwardly-directed pin on said casing, said casing being in operative connection with said blade-operating devices, and said pin being adapted to pass through an opening in said casing and into a recess in said arm and thereby locking said blade-operating devices, substantially as shown and described.

In testimony that I claim the foregoing as my invention I have signed my name, in presence of the subscribing witnesses, this 30th day of December, 1904.

PATRICK M. SCANLAN.

Witnesses:
F. A. STEWART,
C. J. KLEIN.